Feb. 11, 1941.　　　T. T. HARVEY　　　2,231,071
ASTRONOMICAL INSTRUMENT
Filed March 19, 1940　　　2 Sheets-Sheet 1
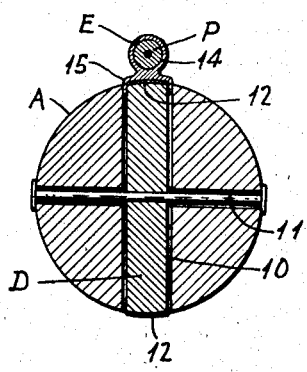
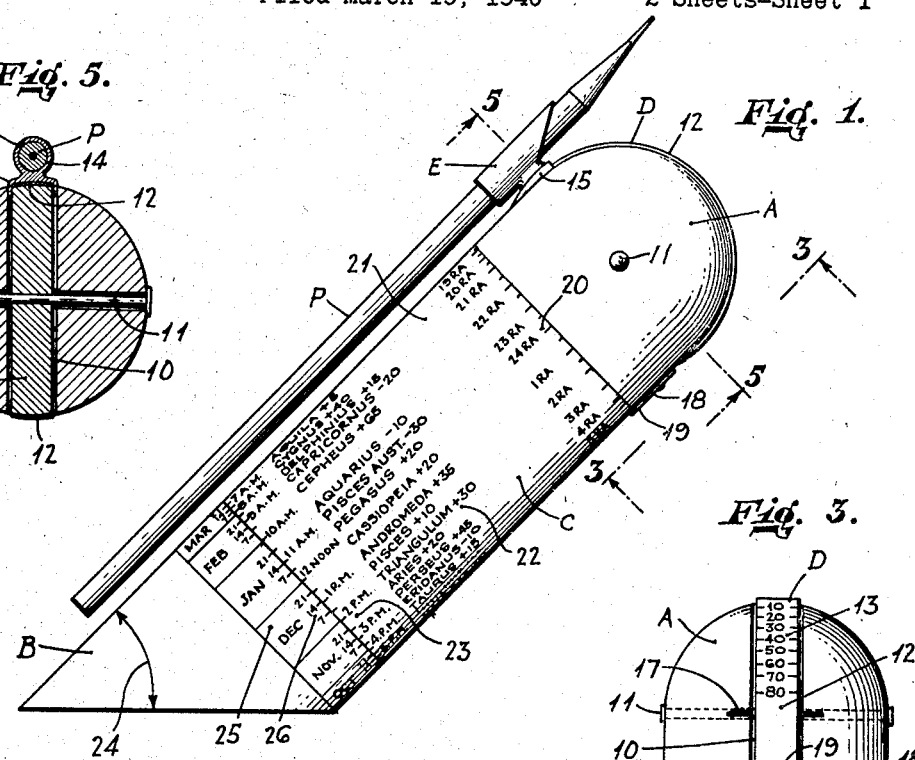
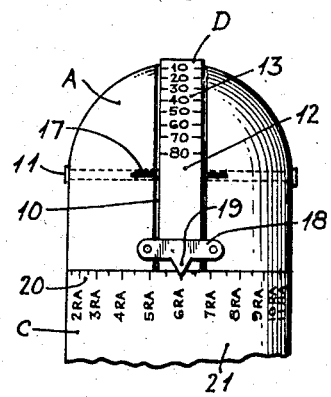
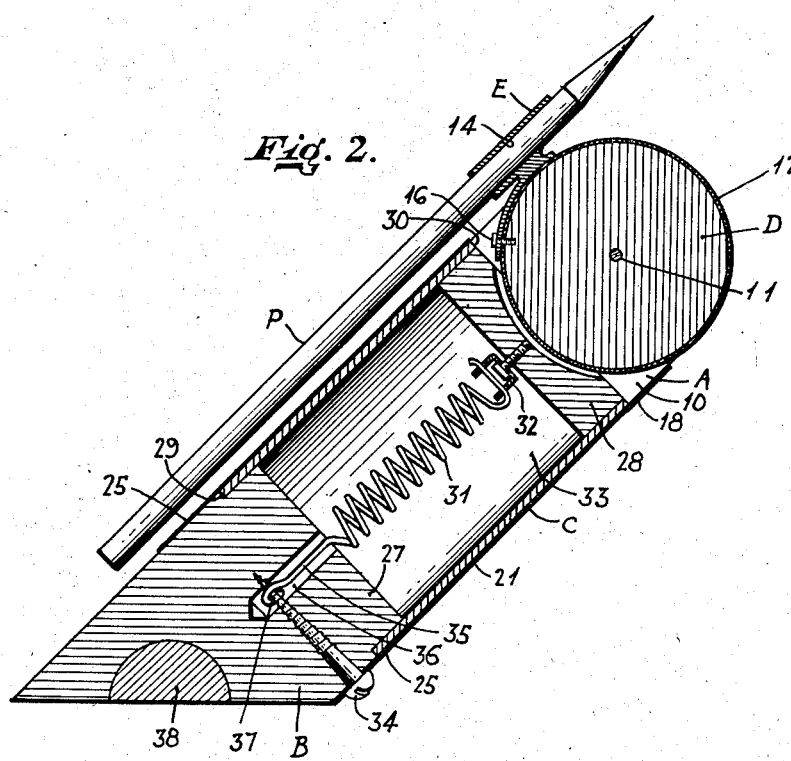
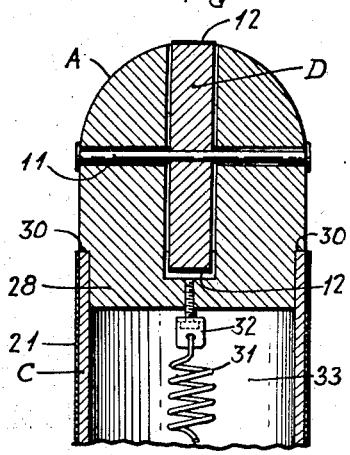
INVENTOR.
THOMAS T. HARVEY
BY
ATTORNEY.

Feb. 11, 1941.   T. T. HARVEY   2,231,071
ASTRONOMICAL INSTRUMENT
Filed March 19, 1940   2 Sheets-Sheet 2
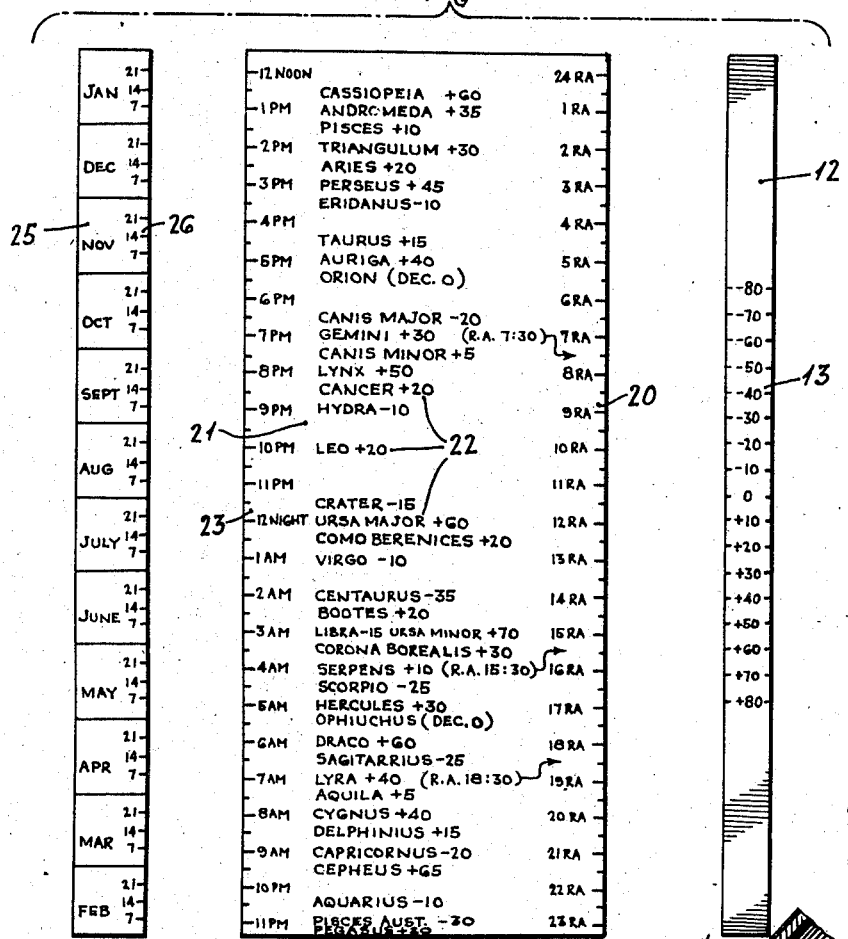
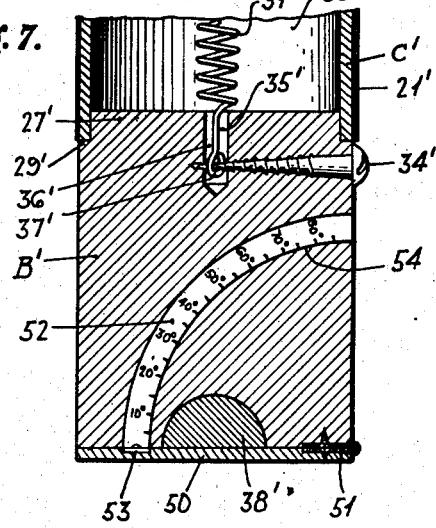
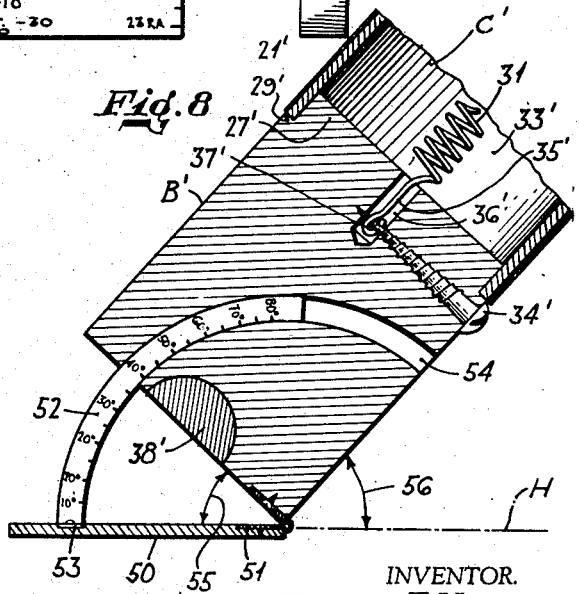
INVENTOR.
THOMAS T. HARVEY
BY
ATTORNEY.

Patented Feb. 11, 1941

2,231,071

UNITED STATES PATENT OFFICE 2,231,071

ASTRONOMICAL INSTRUMENT

Thomas T. Harvey, Denver, Colo.

Application March 19, 1940, Serial No. 324,771

10 Claims. (Cl. 35—43)

The present invention relates to an astronomical observation instrument and more particularly relates to a device whereby the position of any constellation or star may be readily determined and observed.

Heretofore, it has been difficult to determine the position of various celestial objects without having recourse to elaborate and complicated tables. Also, often when the position of a celestial body was determined, its observation was difficult without expensive and elaborate astronomical instruments.

It is one of the objects, therefore, of the present invention to provide an astronomical device whereby the exact position of any celestial object may be readily determined by fixing its declination and right ascension for any hour of the day and any day of the year.

Another object is to provide a relatively inexpensive, portable device which is easy to manufacture and having a simplified construction with a minimum of complicated, easily breakable parts.

Another object is to provide an astronomical device whereby the relatively complicated sciences of astronomy, navigation and surveying will be greatly simplified and popularized among students, amateur astronomers and the general public.

Other objects and advantages will be obvious or will appear during the course of the following specification.

In accomplishing the above objects, it has been found most suitable according to the various embodiments of the present invention to provide a cylindrical body having indicia thereon indicating the various stars and constellations with their respective positive or negative declinations in degrees measured from the equator and right ascensions in hours measured easterly from the vernal equinox or first point of Aries. The cylinder is also provided with a time scale in hours corresponding to the right ascension indicia.

The cylindrical body is preferably hollowed and is rotatably connected on its lower end with a base portion having an inclined frusto-cylindrical configuration. The portion of the base nearest the cylindrical body is provided around its periphery with a calendar scale indicating the days and months of the year and is adapted to be used in conjunction with the indicia indicated on the main cylindrical body.

The upper end of the cylinder is rotatably connected with a top portion or dome having a declination wheel rotatably mounted in a slot therein. The declination wheel has suitable indicia on its circumference indicating positive and negative declinations from 0° to 80°. The declination wheel also carries a tubular device which is adapted to receive a pencil, pointer, or other suitable indicating means.

The top portion or dome also carries on one side a pointer or indicator which operates in conjunction with the right ascension scale on the main cylinder.

The main cylinder is preferably hollow and is connected with the base and dome by a spring which passes through the middle of the main cylinder and is firmly connected with the base and dome.

The base is preferably cut or formed at an angle corresponding to the latitude of the place of observation. This angle may be also corrected for parallex and refraction. Due to the angle construction of the base portion the longitudinal axis will run along the prime meridian and point directly to Polaris.

The declination wheel in the dome is equatorially mounted in its normal position at right angles to the longitudinal axis of the cylinder.

The device may be inexpensively constructed of wood, metal, cardboard, plastic substances such as Catalin, casein derivatives, phenol-formaldehyde and urea formaldehyde resins and the indicia may be etched, engraved or embossed on the surface thereof or may be printed on suitable paper or other substances and fastened to the outer surface thereof.

In the drawings are illustrated two embodiments according to the preferred invention, but to which the present invention is by no means restricted since many changes and variations may be made without departing from the scope of the present invention.

Figure 1 is a side elevational view of the astronomical device in its normal operating position.

Figure 2 is a longitudinal sectional view showing the interior construction of the device.

Figure 3 is a front elevational view of the upper portion of the device taken along the line 3—3 of Figure 1.

Figure 4 is a sectional view similar to Figure 3 showing the interior construction of the dome.

Figure 5 is a transverse sectional view taken along the line 5—5 of Figure 1.

Figure 6 is a developed front elevational view of the various indicia mountings.

Figure 7 is a fragmentary longitudinal sectional view of a modified form of the invention.

Figure 8 is a sectional view similar to Figure 7 of the modification in its operating position.

Referring more particularly to the drawings, the device comprises a dome A, a base portion B and central cylindrical portion C. The dome A is slotted at 10 to receive the declination wheel D which is rotatably mounted in the slot 10 by means of a pin or shaft 11. The wheel D has tape 12 on which are indicated the positive and negative declinations 13. The declinations may be indicated by plus and minus signs or by black and red printing. The wheel D is also provided with a tubular shaped cap or clamp E which is fastened to the declination wheel D by means of the turned flanges 15 and the pin 16.

It is understood that the device may be used without the pencil or pointer by merely sighting through the hollow portion 14 of the clamp E. A dome A is also provided with the indicating marker 17 which is used for setting the declination reading on the declination wheel D. The lower portion of the dome A has the indicator 18 with the arrow 19 for registering the right ascension on the scale 20 of the cylinder C.

The cylinder C has the tape 21 secured to its outer circumference, the tape having the indicia 20 denoting the twenty-four hours of right ascension, the indicia 22 indicating the various constellations with their declinations and the indicia 23 indicating the hours from twelve noon to twelve midnight.

The base B is formed with the angle 24 corresponding to the latitude of the place of observation and has the tape 25 bearing the indicia 26 indicating the days and months of the year. The indicia 26 is used in conjunction with the indicia 23 on the cylinder C.

The base B and dome A have the reduced diameter portions 27 and 28 over which the hollow cylinder C is slipped, abutting the shoulders 29 and 30. A spring 31 fastened at 32 to the reduced diameter portion 28 of the dome, extends through the interior 33 of the cylinder C and is secured to the base B by means of the screw 34. The end 35 of the spring 31 extends into the hole 36 and is looped at 37 to admit the screw 34. The lower portion of the base B is weighted by means of the lead portion 38. If desired, a swivel may be provided at the point 32 so that it will not be possible to subject the spring 31 to undue twisting.

In the modification shown in Figures 7 and 8, the same parts being shown wtih primed reference characters, the base B' is connected to the base plate 50 by means of the hinge 51. An arcuate scale member 52 is connected to the plate 50 at 53 and extends through the arcuate slot 54 in the base B. The scale member 52 may be made of a thin metal strip and holds the device at any angle with the horizontal plane H by its frictional engagement with the corresponding slot 54. It is understood that any other method of retaining the device in a predetermined position may be used such as thumb screws. The member 52 has the indicia 55 indicating a range of degrees from 0 to 80. In operation the scale member 54 is set to correspond to the latitude of the place of observation, the angle 55 corresponding to the angle 56, or the angular distance of the observer from the equatorial plane to the celestial pole. In this way a quick and easy adjustment can readily be made to obtain an equatorial mounting of the device for any place of observation.

The operation of the device is as follows: For example it is desired to locate the constellation Cassiopeia at 10 p. m. December 1. The base B is rotated against the spring tension of the spring 31 until December 1 on the scale 26 of the tape 25 is directly opposite 10 p. m. on the scale 23 of the cylinder tape 21. Then the dome A is rotated until the pointer 19 is opposite Cassiopeia on the scale 22. The right ascension will then be 24. After Cassiopeia on the scale 22 is listed the plus or minus declination in degrees. The declination wheel D is then turned until the indicator marker 17 on the dome A is directly in line with the declination scale 13. The pointer P will now point to Cassiopeia.

It is thus apparent that the applicant has devised a simple construction for a star and constellation finder which will not readily get out of order, which is easy to manufacture and which requires a minimum amount of care and skill for its successful operation.

It is also apparent that the specific illustration shown above has been given by way of illustration and not by limitation and that the structure above described is subject to wide variation and modification without departing from the scope or intent of the invention, all of which variations and modifications are to be included within the scope of the appended claims.

What is claimed is:

1. In an astronomical device of the character described, said device comprising a base portion, an upwardly obliquely extending cylindrical shell mounted on said base portion and forming a body portion and a top portion mounted on said body portion, rotatably connected with each other and bearing suitable astronomical indicia thereon, said device being adapted to indicate a predetermined celestial object when the indicia on said first mentioned portions are brought into successive alinement with each other.

2. An astronomical device of the character described, said device comprising a base portion, an upwardly obliquely extending cylindrical shell mounted on said base portion and forming a body portion and a top portion mounted on said body portion, rotatably connected with each other and bearing suitable astronomical indicia thereon, indicating various celestial objects with their declination and right ascension for any predetermined time, and means connected with said top portion, to indicate a predetermined celestial object when the indicia on said first mentioned portions are brought into successive alinement with each other.

3. In an astronomical observation device, a base having an oblique rest, the obliquity of which corresponds to the observation position, an upwardly projecting rotatable cylinder mounted on said base, a top portion rotatably connected to said cylinder, a wheel rotatably mounted in said top portion, and a pointer carried by said wheel, said pointer consisting of a cylindrical holder and a pencil received in such holder, and upper and lower ends of said cylinder being telescoped onto the upper and lower portions of said base and said top portion respectively, and said telescoped portions of said cylinder, said base and said top portion being relatively rotatable.

4. In an astronomical observation device, three elements rotatably connected to each other carrying respectively month and day, time of day and right ascension, and declination scales, said device being adapted to indicate a predetermined celestial object when the indicia on said elements are brought into successive alinement with each other, said three elements being all cylindrical and having a common axis, the lowermost element serving as a base and being obliquely cut off at its bottom portion and recessed at its top portion, the middle element consisting of a cylindrical shell, the lower portion of which is fitted upon the recessed portion of said lowermost element and the uppermost element being recessed at its lower end to fit into the upper end of the cylindrical shell, and said upper element being provided with a pointer member being mounted to rotate on a transverse axis in respect to the axis of said three elements.

5. In an astronomical observation device, a base having an oblique rest, the obliquity of which corresponds to the observation position, carrying a scale for the months and days, an upwardly projecting rotatable cylinder mounted on said base, carrying an hour scale, a list of constellations and a right ascension scale, a top portion fitted into the upper portion of said rotatable cylinder and rotatably mounted in respect to said cylinder, a wheel rotatably mounted in said top portion, carrying a declination scale and a pointer carried by said wheel, said device being adapted to indicate a predetermined celestial object when the indicia on said elements are brought into successive alinement with each other.

6. An astronomical appliance comprising an obliquely truncated cylindrical base member, the oblique face of which will rest upon a support for the appliance, a hollow cylindrical shell member having a bearing mount upon the upper portion of said base, said cylindrical shell member carrying a plurality of scales at the ends thereof showing time, constellations and right ascension respectively, and the upper portion of said base carrying a scale showing the date and a top cylindrical member rotatably mounted in the top of said sleeve and provided with a transversely pivoted pointer member, said pointer member being provided with a scale showing declination.

7. In the appliance of claim 6, said last-mentioned scale consisting of a graduated ring fitted into said top member and said pointer member including a pencil holder receiving an elongated pointer element, said element being sighted along the side of said cylindrical shell member.

8. In the appliance of claim 6, a coil spring extending axially through said cylindrical shell member holding said base member and said top member together and holding them against said shell member upon relative rotation movement between said shell member and said base member and said top member.

9. An astronomical appliance of the character described, comprising cylindrical dials having parallel scales representing the date, the time, the constellation and right ascension respectively, and a transverse scale representing the declination, said scales representing time, the constellation and right ascension being fixed upon a central upwardly extending elongated cylindrical member, said scale representing the date being positioned on a base forming a lower bearing mount for said shell member and said transverse scale carrying a pointer member and being carried by an upper bearing mount for said shell.

10. The appliance of claim 9, means being provided on said base to adjust the angle of obliquity of said shell member.

THOMAS T. HARVEY.